Patented Apr. 30, 1940

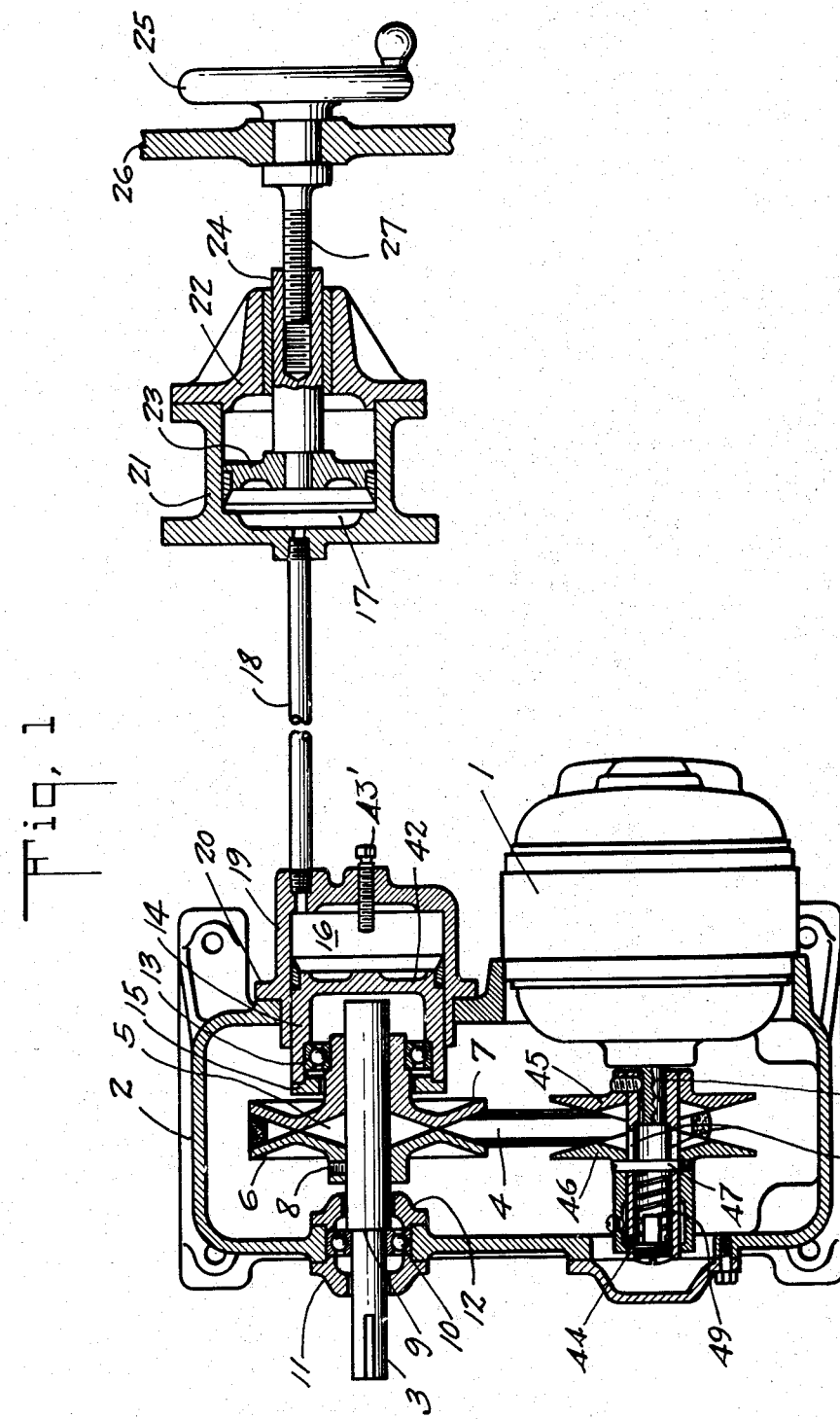

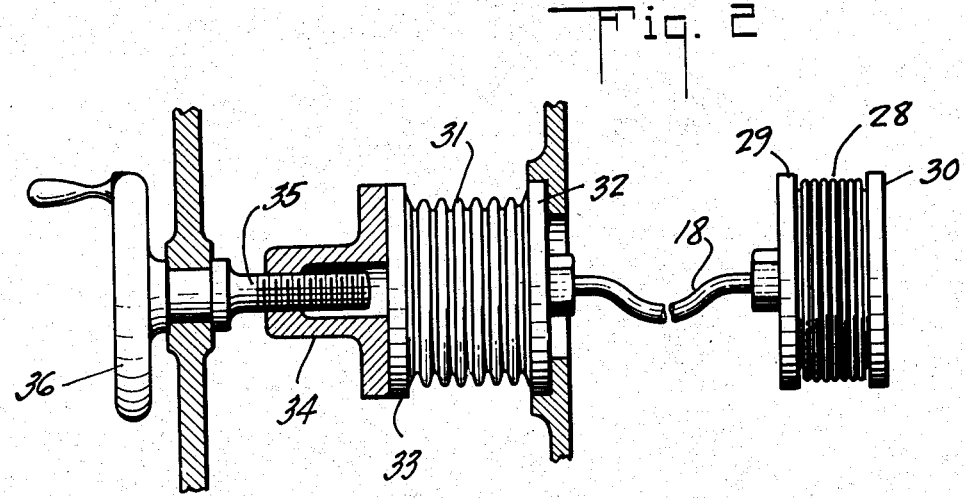
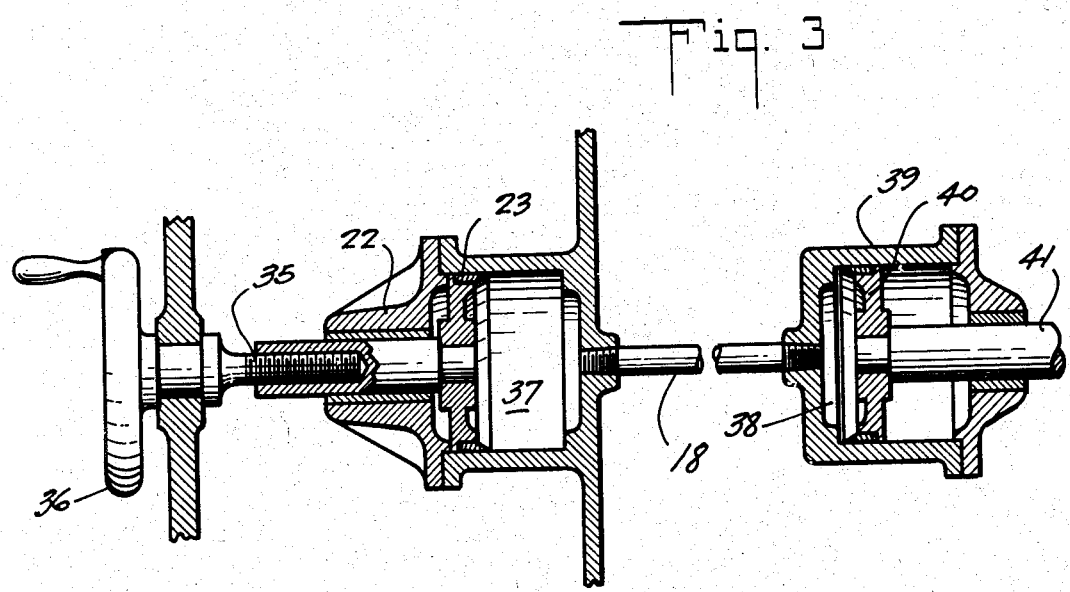

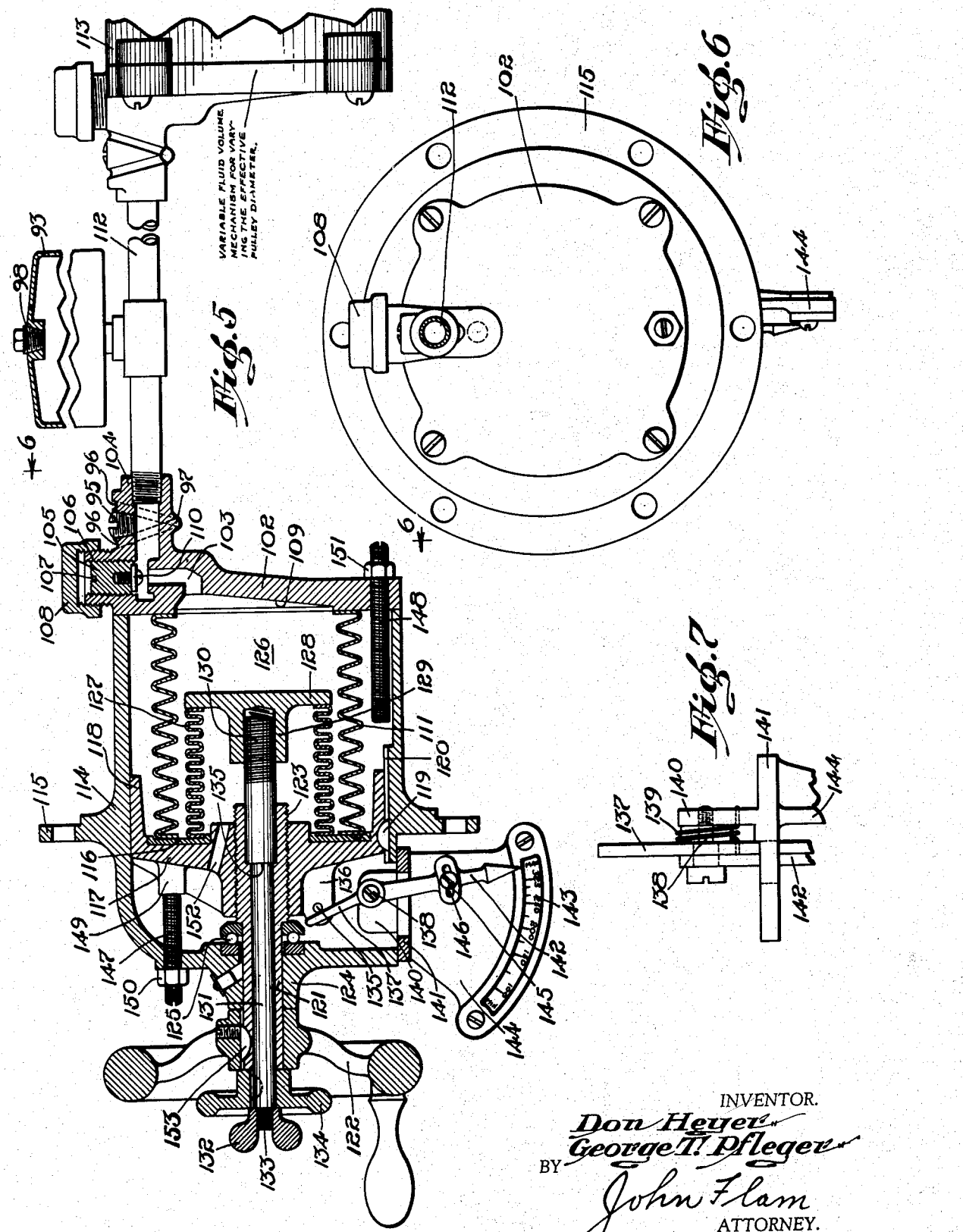

2,198,940

UNITED STATES PATENT OFFICE 2,198,940

VARIABLE SPEED ELECTRIC POWER UNIT

Don Heyer and George T. Pfleger, Los Angeles, Calif., assignors to U. S. Electrical Motors, Inc., a corporation of California Application March 6, 1933, Serial No. 659,684

8 Claims. (Cl. 74—230.17)

This invention relates to an electric motor drive, and more particularly to an adjustable transmission mechanism whereby the drive ratio from the motor to the load can be varied through small increments.

This is accomplished by the aid of pulley structures, the effective diameters of which can be varied. Each pulley structure can comprise a pair of pulley sections movable with respect to each other in an axial direction, and each having a belt-engaging face that is sloping. Thus as the sloping faces approach each other, the flexible belt engaging the faces moves outwardly and the effective pulley diameter is increased. Conversely, when the sloping faces recede from each other, the flexible belt is permitted to move inwardly, and the effective pulley diameter is decreased.

It is one of the objects of this invention to provide a simple and compact electric power unit in which the speed variations can be efficaciously secured.

It is another object of the invention to make it possible to control the variable pulley structure from a remote point, and particularly by the aid of fluid pressure.

This invention possesses many other advantages, and has other objects which may be made more easily apparent from a consideration of several embodiments of the invention. For this purpose there is shown a few forms in the drawings accompanying and forming part of the present specification. These forms shall now be described in detail, illustrating the general principles of the invention; but it is to be understood that this detailed description is not to be taken in a limiting sense, since the scope of the invention is best defined by the appended claims.

Referring to the drawings:

Figure 1 is a plan view of a power unit embodying the invention; the pulley structure, the remote control device, and the motor casing being shown in section;

Figs. 2 and 3 are sectional views of modifications of the remote control device;

Fig. 5 is an enlarged view showing a system similar to Fig. 1, but with an arrangement for compensating for losses of fluid or for belt wear;

Fig. 6 is a detail end view, taken from plane 6—6 of Fig. 5; and

Fig. 7 is an enlarged detail of one of the elements used for indicating the speed of the unit for any adjustment.

Figure 4:
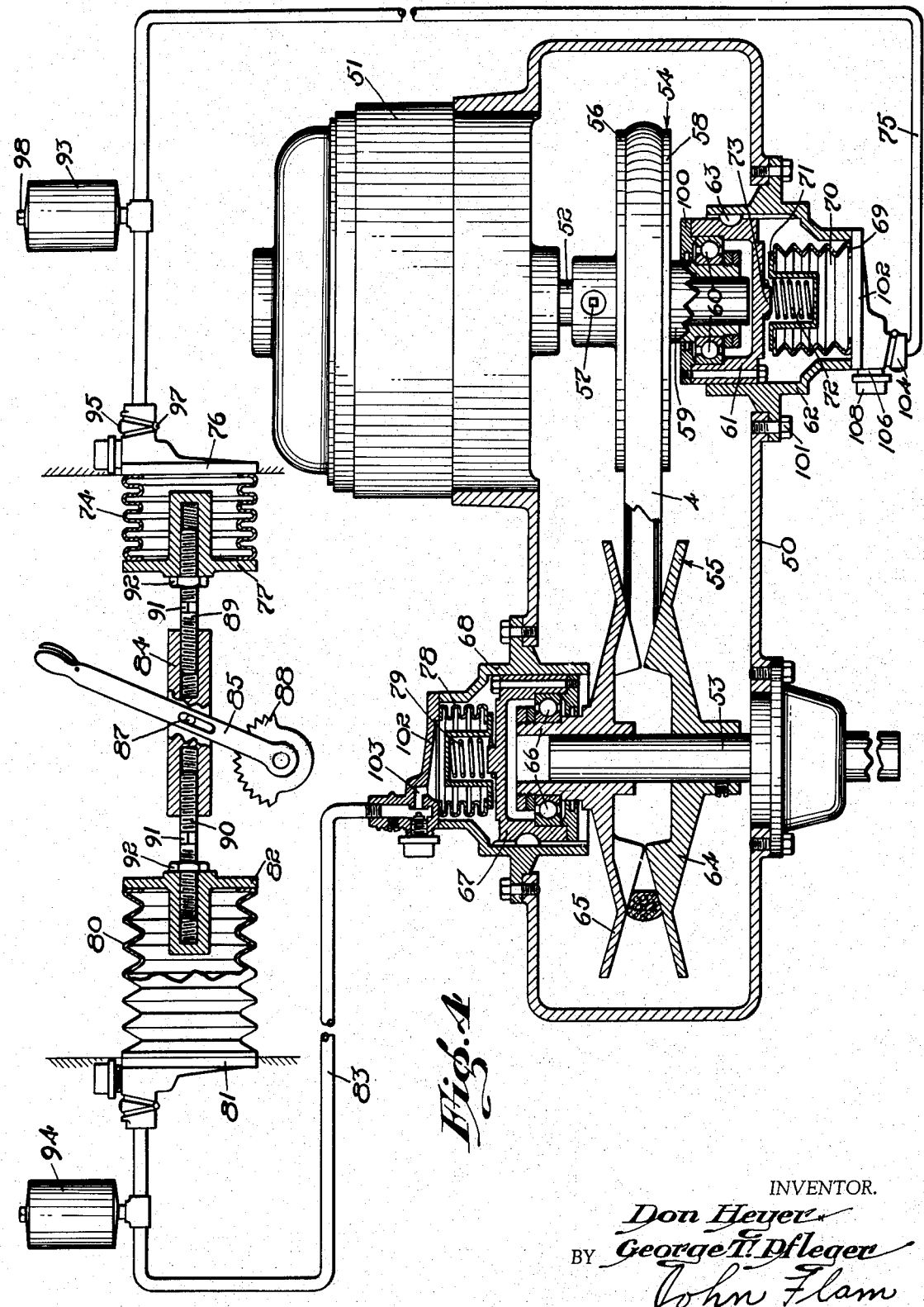
Fig. 4 is a diagram, mainly in section, of a form of the invention in which two adjustable pulley structures, joined by a flexible belt, are controlled by fluid pressure.

An electric motor 1 (Fig. 1) is shown as mounted in an enclosed casing 2. This casing has a protruding shaft 3 which may be appropriately coupled to a load. This shaft 3 is arranged to be driven from the motor shaft, as by the aid of a flexible belt 4 which can engage an adjustable pulley structure 5, carried by shaft 3.

This adjustable pulley structure comprises two relatively movable sections 6 and 7. One section, such as 6, may be firmly fixed to shaft 3, as by set screw 8; and the other section 7 may be splined to shaft 3, to permit axial movement thereof with respect to the shaft and with respect to the other section 6. Since the opposed faces of these pulley sections are inclined, it is apparent that axial adjustment of pulley section 7 causes a corresponding variation of the effective pulley diameter. Thus in the position shown in Fig. 1, the opposed sloping faces are brought as close together as permissible, and, therefore, the effective pulley diameter is a maximum. By moving the adjustable section 7 toward the right, the sloping faces separate, permitting the V-belt 4 to move closer to the axis of shaft 3, whereby the effective pulley diameter is reduced.

It is to be understood, of course, that belt 4 may pass around a similar pulley structure fastened to the shaft of motor 1, and this pulley structure, so fastened to the shaft 43 of motor 1, is arranged automatically to take up the belt slack as is well understood; for example, by the aid of a resilient force urging the pulley sections together. One form of such a mechanism is disclosed in the application filed September 2, 1932, in the name of Don Heyer, Serial No. 631,533, and entitled "Variable speed transmission device."

Thus on motor shaft 43 is fixed a hollow extension 44. On this extension is a fixed pulley section 45. The movable pulley section 46 is slidable over the extension 44, and is constrained against rotation relative to the shaft as by a pin 47 passing through slots 48 in the extension 44 and fastened to the hub of section 46. A compression spring 49 is enclosed in extension 44 and acts against the pin 47 to urge it toward the right in slots 48. This spring thus urges pulley section 46 toward section 45 to keep them both in frictional engagement with belt 4.

The manner in which shaft 3 is supported and in which pulley section 7 is adjusted will now be described. Thus the left hand end of the shaft 3 has a shoulder 9 against which the inner race of a thrust ball bearing structure 10 is driven. The outer race is held in the inner surface at an aperture in the casing 2, as by the aid of exterior and interior caps 11 and 12 respectively.

The adjustable pulley section 7 has a hub on which is firmly fixed the inner race of a set of thrust ball bearings 13. The outer race of this ball bearing structure is accommodated in an axially movable member 14. It is thus apparent that since the hub of adjustable section 7 is accommodated in a bearing structure adjacent the right hand end of shaft 3, this shaft 3 is effectively supported at both ends. If desired, a cap 15 fastened to the left hand end of the movable member 14 can be used to maintain the ball bearing 13 in place.

It is apparent that member 14, if moved in a direction that is axial with respect to shaft 3, will perform the function of adjusting the effective pulley diameter. This is due to the fact that axial movement of this member will cause a corresponding axial movement of the adjustable pulley section 7. The manner in which this member 14 is moved will now be described.

Member 14 forms one wall of a closed variable volume liquid chamber 16. The position of the member 14 can be determined by the amount of fluid such as oil in chamber 16. If the quantity of liquid increases, the wall 42 moves to the left. If the quantity is decreased, the wall 42 is moved to the right by the pressure of the belt 4 against the face of the movable pulley section 7. The quantity of this liquid is determined from a remote station, as by the aid of a second variable volume liquid chamber 17 connected to the chamber 16 as by a connection 18. This connection 18 can be a flexible tube, and is indicated as of indefinite length. In this way, the variable volume chamber 17 can be at a place remote from the power unit, and in any convenient location for manual operation.

In the present instance, the variable volume chambers 16 and 17 are formed as by cylinders and pistons. Thus the movable member 14 can form the piston 42, which is the movable wall of the cylinder member 19. The packing or other means by which member 14 is maintained in fluid tight relation to cylinder 19 also suffices to hold the member against rotation. The only force tending to cause such rotation is that transmitted from shaft 3 through bearing 13, and since this force is very slight, the friction of the packing means readily overcomes it. This cylinder can be supported as by the aid of a flange 20 attached to the wall of the casing 2.

Similarly, variable volume chamber 17 can comprise a cylinder member 21, having a cap or cover 22. Inside of cylinder 21 is a piston structure 23, fastened to a stem 24, passing through the cap 22. Stem 24 is constrained against rotation with respect to the cylinder 21. Axial adjustment of the stem 24 thus correspondingly adjusts the volume of cylinder space 17. For the position shown in Fig. 1, this cylinder space is a minimum, while the cylinder space 16 is a maximum.

Since the volume of liquid in the chambers 16—17 and connection 18 is constant, it is apparent that when piston 23 is moved toward the right, piston member 14 must move correspondingly to the right in order to readjust the combined volume of the chambers 16—17 and 18. This movement of the piston 42 toward the right is produced by the pressure of the belt 4 against the face of pulley section 7, as the oil recedes from chamber 16 to follow the movement of piston 23. Conversely, motion of piston 23 toward the left will pass the liquid through connection 18, and will operate the piston 42 toward the left by fluid pressure.

An adjustable stop 43' can be provided, such as a screw or bolt, to limit movement of piston 42 toward the right.

Any appropriate means may be utilized to produce the motion of piston 23 for adjusting the volume of the space 17. In the present instance, there is shown a hand wheel 25 journalled in a stationary wall 26 and having a threaded stem 27. This stem 27 engages the internal threads provided in the stem 24. Rotation of hand wheel 25 thus causes a corresponding axial movement of the stem 24, which is constrained as heretofore mentioned, against rotation.

The hand wheel 25 may be located at any convenient place for manipulation by an operator; and it may be combined with any appropriate indicator for showing the resulting speed attained by shaft 3.

In Fig. 2, the variable volume chambers are formed in a different way. Thus the chamber 28 is in the form of a metal bellows having a tubular corrugated wall which is collapsible. The end walls 29 and 30 are rigid, and wall 29 is fixed. Wall 30 may be connected to the adjusted pulley section.

The other variable volume chamber is formed by a similar metal bellows 31, having a fixed end wall 32 and a movable end wall 33. This end wall 33 carries a flanged nut 34 constrained from rotation and engaged by the threaded stem 35 of the hand wheel 36.

The mode of operation of this form of the invention is substantially the same as that just described in connection with Fig. 1. Movement of the wall 33 toward the right causes a reduction in the volume of the metal bellows and a corresponding increase in volume of the metal bellows 28. Wall 30 will then move toward the right and will effect the speed adjustment.

In the form shown in Fig. 3, the hand wheel 36 and stem 35 are arranged as in Fig. 1. Cap 22 and piston 23 are arranged to vary the volume of cylinder space 37. This cylinder space is connected as by flexible connection 18 to the space 38. This adjustable volume chamber 38 is formed by the aid of a cylinder 39 and a movable piston 40. In this form the movable piston 40 carries a stem 41 which is mechanically connected to the adjustable pulley section to operate it.

In the form thus far described the adjustment for variable speed is accomplished by varying the effective diameter of one of a pair of variable pulley structures. The other one of the pair of pulleys in the transmission is arranged, as by the aid of a spring 49 (Fig. 1) to conform to the adjusted position of the other pulley structure. It is apparent, however, that a fluid control for positive adjustment could be used for pulley structure 45—46 of Fig. 1, which may be entirely similar to the fluid control mechanism used in connection with the pulley structure 5. In such an arrangement another variable volume chamber is utilized, such as 16 (Fig. 1) for moving pulley section 46 from a remote control point.

One elaboration of such a system is indicated in Fig. 4, in which a common manual control is provided for the two pulley structures. In this figure the transmission mechanism is housed in a casing 50. As before, an electric motor 51 can be supported in an aperture in the casing, and can drive a shaft 52. The driven shaft 53 projects out of the casing 50 for appropriate connection to a load.

As in the form of the invention first described, both shafts 52 and 53 carry variable pulley structures such as 54 and 55. Variable pulley structure 54 includes the section 56 fixed against axial movement, as by screw 57 passing through the hub of this section, and engaging shaft 52. The movable section 58 is arranged for axial movement on shaft 52, as by being splined thereto. The hub 59 of this section is supported as by the aid of ball bearings 60 on the inside of axially movable support 61. This support is guided in a slot in the hollow cap structure 62 as by the aid of a key 63 fastened to the member 61.

The end of shaft 52 may be hollow, and the outer race of bearings 60 can be held in place as by a removable dust proof cover 100. Bolts 101, passing through the support 61 can be used to hold this cover in place.

Similarly, the driven pulley structure 55 has a section 64 fixed to the shaft 53. The adjustable pulley section 65 is supported for adjustment in a manner entirely similar to the support for the diagonally opposite pulley section 58. This includes the ball bearings 66 and axially movable support 67 in a cap member 68.

For the positions shown the effective diameter of pulley structure 54 is at a maximum, and the effective diameter of pulley structure 55 is at a minimum. In other words the adjustable sections 58 and 65 have moved to their extreme left hand positions. Motion of these sections to the right will cause simultaneous reduction in the effective diameter of pulley structure 54, and a corresponding increase in the effective diameter of the pulley structure 55.

Simultaneous adjustment of the pulley sections 58 and 65 can be secured as by the aid of a plurality of piston and cylinder mechanisms such as disclosed in Fig. 1, or by any other appropriate fluid control mechanism involving variable or adjustable volume fluid chambers. In the present instance there are shown metal bellows structures, capable of compression and expansion, for forming the variable or adjustable volume chambers.

Thus for example, to the cover 102 of cap 62 can be fastened the stationary wall 69 of a metal bellows structure 70. The movable wall 71 of this bellows 70 is arranged to move the support 61 upon an expansion and contraction of the bellows. Instead of a direct mechanical connection between the walls 71 and the support 61, there is preferably included a compression spring 72 seated in a reentrant portion of the wall 71. The lower end of this spring seats on the wall 71, and its upper end telescopes over a spring guiding boss 73. The spring 72 is strong enough to take up belt wear or slack, by urging the removable section 58 resiliently into contact with the belt 4. The strength of the spring is designed for this purpose, as well as to provide sufficient frictional force between the pulley structure and the flexible belt to transmit the mechanical load.

In this way, the wall 71, in conjunction with the adjacent surface of member 61, serves as a limit for the separating action of the section 54 when a heavy load is imposed upon the device. Thus these surfaces may abut temporarily, as when there is a heavy starting torque. For normal operation, spring 72 is strong enough to separate the surfaces by urging the bearing support member 61 to the relative position shown.

The cover 102 for cap 62 is similar in structure to cover 102 shown in Figs. 5 and 6, and in connection with member 68. Thus this cover can have a right angled port 103 leading to a connection nipple 104. In order to make it possible to fill the bellows 70 prior to installation, and prior to coupling to a connection 75 leading to a remote control adjustable volume fluid chamber, there is provided a closure 105 adapted to cooperate with the end of port 103, optionally to interrupt the passage to nipple 104.

For this purpose, closure 105 is threaded into a boss 106, as by the aid of a screw driver slot 107, and it can be screwed down so that a leather closure washer 110 may be urged tightly over the end of port 103. However, in normal operation, the member 105 is left raised off its seat, as shown clearly in Fig. 5.

Further to ensure against unauthorized or inadvertent variation in the position of member 105, as well as to ensure further against leaks, a supplemental cap 108 can be screwed tightly over boss 106. It is also noted in Fig. 5 that the inner wall 109 of cap 102 is inclined. Thus when the entire bellows structure is being filled through nipple 104 the air being displaced by the oil is guided by this slanting wall to escape out of the structure without danger of being trapped.

After complete filling, the closure member 105 is screwed down, and the bellows structure can be shipped to the location where the unit is to be assembled. There the connection 75 is coupled to nipple 104, and the mechanism placed in condition for operation in a manner to be described in detail hereinafter.

The volume of bellows 70 can be controlled from a remote point, as by the aid of an adjustable volume chamber formed by a metal bellows 74. The interior of this metal bellows is connected by conduit 75 (shown as of indefinite length) with the interior of bellows 70, through nipple 104. One wall 76 of bellows 74 is stationary, while the other wall 77 is movable. Wall 76 can be in the form of a cover having a construction similar to the other covers 102, by the aid of which the filling and shipment of bellows 74 are facilitated.

If the metal bellows 70 and 74 with their connections 75 be filled with an incompressible fluid, such as oil, it is apparent that an adjustment in the volume of bellows 74 causes a corresponding opposite variation in volume of bellows 70. Accordingly, the movable wall 71 will move either to the right or left, causing adjustable pulley section 58 to assume its desired position.

A substantially similar control system is utilized in connection with the movable support 67 of pulley structure 55. In this case there is a bellows 78 and a compression spring 79 interposed between it and support 67. An adjustable volume chamber is formed by the metal bellows 80. This metal bellows has a stationary wall 81 and a movable wall 82. The interior of bellows 80 is connected to the interior of bellows 78 through the conduit 83. The two fluid systems for the two pulley structures are isolated from each other; but the two movable walls 77 and 82 can be mechanically joined, as by a rod 84. Movement of the rod in one or the other direction causes a reduction in volume of one bellows and an increase in volume of the other bellows, whereby proper movements of adjustable pulley sections 58 and 65 are secured. A hand lever 85 can be joined as by a slot and pin connection 87 to the connecting rod 84 for simultaneous adjustment of the volumes of bellows 74 and 80. The position of the lever 85 can be maintained as by a common form of latch mechanism, including a segment bar 88.

Provisions are made for setting the volume of each of the fluid spaces, to ensure that both fluid systems may operate the respective movable sections 58 and 65 in proper synchronized action. Such setting may be necessitated, for example, due to slight oil leaks in service, or belt wear.

For this purpose, the movable walls 77 and 82 are respectively joined to rod 84 by adjustable connections 89, 90. These can be in the form of studs having right and left hand threads at their extremities, engaging respectively in threaded apertures in the rod 84 and walls 77, 82. Thus by turning either of these studs as by the aid of squared portions 91, the movable walls 77 and 82 can be set to take up slack. After such setting, a check nut 92 can be tightened against the movable wall to hold the setting against accidental variation.

This setting is probably accomplished at rather infrequent intervals, such as once a month or longer period. In order to ensure that sufficient oil will always be available, each system is provided with a comparatively large container 93, 94, which can be filled for example at still more infrequent intervals, such as annually. These containers are in communication with connections 75 and 83 respectively.

In operating the system shown in Fig. 4, it is apparent that the setting of the effective pulley diameters can take place even while the apparatus is stationary. Thus for example, in the position shown, bellows 78 can be expanded within the limits of the clearance between the bellows and support 67; and correspondingly, bellows 70 for the pulley structure 54 is contracted, permitting spring 72 to expand. Belt 4, being disposed between the sections 64, 65, prevents these sections from moving toward each other while the apparatus is stationary. However, as soon as the motor 51 is operated, the belt 4 moves outwardly to correspond to the presetting. By increasing the clearance between the bellows structures 70, 78, and the supports 61, 67, this presetting during standstill can be accomplished for a substantial range of pulley diameters.

The advantage of this mode of operation is that the motor 51 can be set for low speed operation of the load shaft 53 even before the motor is started.

The manner in which the power unit can be installed will now be described. The bellows 70, 78, 74 and 80 can be filled and closed as heretofore described, prior to shipment of the unit, the connections 75 and 83 being unconnected to their respective bellows. After properly setting up the machine and the manual control, the connections 75, 83 are threaded into the nipples 104. With the bellows still closed, containers 93, 94 are filled. Since both fluid systems are similar, the description will proceed with system 70—75—93—74.

Air will be trapped between the oil flowing from reservoir 93 and each of the bellows 70, 74. To allow this air to escape, a screw 95 (Fig. 5) is removed from nipple 104 to form an air vent. The air escapes and oil will overflow. This overflowing oil is prevented from flowing down cover 102 by annular grooves 96 leading to a drain tip 97 on the lower side of nipple 104. Then plug 95 is replaced, and container 93 is refilled, and closed by plug 98. Now cap 108 can be removed, and closure valve 105 retracted to place the bellows in communication with connection 75. Similar steps are taken to vent the air between container 93 and bellows 70.

In the form of the invention shown in Fig. 4, the volumes of the two fluid systems, including respectively, metal bellows 70, 74 and the metal bellows 78, 80 can be set by varying the position of one of the walls in the metal bellows. This setting of the volume can be accomplished, however, in other ways.

For example, in the form of the invention shown in Figs. 5, 6, and 7, a fluid control system is indicated in which use is made of an adjustable volume metal bellows 111. This metal bellows is coupled by a connection 112 to a variable volume mechanism 113 acting on a movable pulley section. The metal bellows 111 has its right hand end fastened, as by soldering, to the cover member 102. This cover member, as described in connection with Fig. 4, carries the closure member 105, as well as the nipple 104 for facilitating connection to the device 113.

In order to house the adjustable bellows 111 properly, use is made of a stationary casing 114, in which the bellows 111 is accommodated. This stationary casing can be supported on any appropriate stationary surface, as by the aid of a flange 115.

The left hand end of the bellows 111 is joined as by soldering, to a plate 116. This plate abuts against the inner surface of an axially movable member 117, but need not be joined thereto. This member 117 is slidable inside of casing 114, and is provided with a deep flange 118 to guide it properly inside of the casing. The plate 116, which is annular in form, is passed over the hub of the member 117, and fits between this hub and the flange 118. In order to prevent rotation of member 117 within the casing 114, use may be made of a spline construction. Thus a key 119 can be carried by member 117 at its outer periphery slidable in a keyway 120 on the inner wall of the casing 114.

It is apparent that movement of member 117 to the right will compress the bellows 111; and conversely, movement of member 117 to the left will expand the bellows 111.

This axial motion of member 117 is accomplished in the present instance by the aid of a shaft 121. This shaft is rotatable as by a hand wheel 122 securely fastened thereon, as by a key 153. The shaft furthermore has an enlarged threaded portion 123 engaging in corresponding threads in the hub of member 117. The shaft 121 passes through a clearance aperture in the boss 124 of casing 114. It is restrained against axial movement by the hub of wheel 122, contacting with the left hand surface of the boss 124, as well as by a thrust bearing 125 located between a shoulder at the left hand end of the enlarged threaded portion 123, and the inner side of the casing 114. It is thus apparent that as hand wheel 122 is turned, the bellows 111 can be adjusted.

To form a closed chamber 126 inside of bellows 111, there is provided in the present instance a supplemental or auxiliary metallic bellows 127, which is reentrant with respect to the bellows 111. The left hand end of the inner bellows 127 is securely fastened to the plate 116, as by soldering. Its right hand end is similarly fastened to a disc 128, forming an imperforate wall. It is thus seen that the effective volume of the bellows mechanism 111—127 includes the annular space between the two bellows as well as the space between the members 128 and 102. In ordinary operation, the disc 128 is moved axially in exact synchronism with the motion of member 117; that is, bellows 127 is not collapsed or expanded during normal operation of adjusting the speed, all of the volume variation taking place solely by virtue of the fact that member 117 approaches cover 102.

To provide this synchronous motion of disc 128 with member 117, this disc 128 is provided with a tapped boss 129. In this boss is engaged the threaded end 130 of a shaft 131. This shaft 131 is accommodated inside of shaft 121, which is made hollow for this purpose. The pitches of the threads on shafts 121 and 131 are exactly the same; so that when shafts 121 and 131 are locked together for rotation, the disc 128 is advanced on portion 130 at the same rate as member 117 is advanced on portion 123. Therefore, the distance between these two elements 117 and 128 remains constant while the two shafts 121 and 131 are rotated in unison.

This rotation in unison is accomplished by fastening shaft 131 within shaft 121, as for example by the aid of a wing nut 132. This wing nut engages the threaded reduced end 133 of the shaft 131. This wing nut presses against a small hand wheel 134 fastened to shaft 131, and thereby pulls the shoulder 135 on shaft 131 against a corresponding internal shoulder in the exterior shaft 121. It is apparent that as long as the nut 132 is tight, shaft 131 is held frictionally against rotation in shaft 121. Therefore, rotation of hand wheel 122 acts to rotate both of these shafts, and accordingly members 117 and 128 are moved in unison.

Now should it be desired to set the volume of space 126 to take up for loss in liquid or for belt wear, it is possible to do this by moving disc 128 with respect to member 117, thereby expanding or contracting bellows 127. To accomplish this result, wing nut 132 is loosened. Then while hand wheel 122 is held stationary, the hand wheel 134 can be rotated to rotate shaft 131 with respect to shaft 121. This relative rotation causes bellows 127 to be expanded or contracted as desired. After the adjustment is completed, wing nut 132 can be tightened and the two shafts 121 and 131 held together against relative rotation.

It is also possible to provide an effective speed indicator, which responds to the axial position of member 117. This member can be provided with a transverse pin 135 supported on a rib 136. A rotatable lever 137 (Figs. 5 and 7) is mounted on a pivot screw 138. This pivot screw 138 is supported on an upstanding rib 140 provided in a slotted cover 141 for casing 114. A helical spring 139 acts to urge the pivoted lever 137 resilient against the pin 135 so that this lever follows the position of the pin. The lower end 137 of the lever, passing through cover 141, carries a pointer mechanism 142, cooperating with an arcuate scale 143 supported on a bracket 144.

In order to adjust the pointer 142 for calibration purposes, lever 137 is not permanently joined to the pointer 142. Instead, this pointer 142 overlies the lever 137 and is pivoted on the pivot pin 138. An adjusting screw 145 passes through an arcuate slot 146 in the pointer 142, and engages a threaded aperture at the extremity of the lever 137. It is thus apparent that by loosening the adjusting screw 145, the pointer 142 can be moved angularly on its pivot with respect to lever 137, within the limits prescribed by the arcuate slot 146. Thus the pointer 142 can be moved without disturbing the position of lever 137, and can be held in any adjusted position by tightening the screw 145, holding the pointer 142 and lever 137 together.

In this form of the mechanism also, a container 93 can be inserted in the connection 112 to provide a convenient mode for filling the system.

In order to impose limits upon the axial movement of member 117, use can be made of adjustable abutments 147 and 148. Each of these is in the form of a threaded stud extending in an axial direction and adapted respectively to cooperate with a boss 149 on member 117, and with the edge of flange 118. In the position shown the bellows 111 is in fully expanded position, the abutment 147 engaging the boss 149. Upon movement of member 117 toward the right, ultimately the abutment 148 will be engaged by the flange 118.

The abutments 147 and 148 may be threaded into threaded apertures in the casing 114 and in the cover 102. They may be held in adjusted position by the aid of lock nuts 150 and 151.

Preferably also, an air vent 152 can be provided through the member 117 to permit air to escape or enter to the inside of auxiliary bellows 127.

We claim:
1. In a variable transmission device incorporating two adjustable pulley structures, each structure having a pair of relatively axially adjustable pulley sections, each of the sections having inclined belt engaging faces, whereby relative axial adjustment of the sections produces a corresponding variation in effective pulley diameters, the combination therewith of means for simultaneously increasing the effective diameter of one pulley structure and decreasing the effective diameter of the other pulley structure, comprising a pair of means, each forming a variable volume fluid chamber, respectively cooperating with said pulley structures to cause relative movement between the pulley sections, means for simultaneously varying said volumes, and means exerting a resilient force interposed between each variable volume chamber and the corresponding pulley structure.

2. In a variable transmission device incorporating two adjustable pulley structures, each structure having a pair of relatively axially adjustable pulley sections, each of the sections having inclined belt engaging faces, whereby relative axial adjustment of the sections produces a corresponding variation in effective pulley diameters, the combination therewith of means for simultaneously increasing the effective diameter of one pulley structure and decreasing the effective diameter of the other pulley structure, comprising a pair of means, each forming a variable volume fluid chamber, respectively cooperable with said pulley structures to cause relative movement between the pulley sections, a pair of means, each forming an adjustable volume fluid chamber, respectively connected to the variable volume chambers, and means for simultaneously adjusting said adjustable volume chambers, and a pair of reservoirs respectively joined to the connections for passing fluid to the chambers.

3. In a variable transmission device incorporating two adjustable pulley structures, each structure having a pair of relatively axially adjustable pulley sections, each of the sections having inclined belt engaging faces, whereby relative axial adjustment of the sections produces a corresponding variation in effective pulley diameters, the combination therewith of means for simultaneously increasing the effective diameter of one pulley structure and decreasing the effective diameter of the other pulley structure, comprising a pair of metallic bellows, respectively cooperating with the pulley structures, a compression spring interposed between each bellows and its corresponding pulley structure, and fluid pressure means for simultaneously and compensatingly adjusting the volumes of said bellows.

4. In a variable speed drive, a shaft, means for rotatably supporting one end of said shaft and for restricting axial movement thereof, an adjustable pulley structure in axial driving relation to said shaft, said adjustable pulley structure having a pair of pulley sections with opposed inclined belt engaging faces forming by relative axial adjustment variable effective pulley diameters, a hub provided for one of said pulley sections, an axially adjustable member forming a bearing support for said hub and the shaft associated with said pulley structure, a stationary means for slidably supporting said axially adjustable member and for preventing rotation thereof, and fluid pressure means for adjusting the axial position of said axially adjustable member.

5. In a variable diameter pulley structure, a pair of relatively axially adjustable pulley sections having inclined faces, forming by adjustment variable effective pulley diameters, an axially movable member for adjusting and supporting one of said pulley sections, a mechanically adjustable member, a resilient connection between the axially movable member and the mechanically adjustable member, and means for restricting rotation of said axially movable member.

6. In an adjustable pulley structure having a pair of relatively axially adjustable pulley sections, each of the sections having inclined belt engaging faces, whereby relative axial adjustment of the sections produces a corresponding variation in effective pulley diameters, the combination therewith of a bearing axially fixed with respect to one of said pulley sections and serving to support said one section, an axially movable member engaging said bearing for supporting it as well as for adjusting the axial position of said pulley section, an axially movable adjusting means, and a resilient connection between the axially movable member and the axially movable adjusting means.

7. In a variable ratio transmission unit, a variable diameter pulley structure having a pair of relatively axially adjustable pulley sections, forming by relative axial adjustment, variable effective pulley diameters, means forming a variable volume fluid chamber having rigid end walls and a collapsible corrugated wall joining the end walls, an axially adjustable member interposed between one of said walls and said pulley structure, a bearing structure supported on said member and engaging one of the pulley sections, said bearing structure serving to support the pulley section as well as to maintain it in fixed axial relationship with the member, means forming a mechanical connection between said member and said one end wall, whereby movement of the wall is effective to adjust the pulley section, means forming another variable volume chamber remote from said first chamber, a connection between the two chambers, and means for varying the volume of said other chamber.

8. In a variable ratio transmission unit, a variable diameter pulley structure having a pair of relatively axially adjustable pulley sections, forming by relative axial adjustment variable effective pulley diameters, a non-rotary member supported for axial movement with respect to the pulley structure, a bearing structure supported by said member and engaging one of the pulley sections, said structure being adapted to support the pulley section with respect to the member as well as to maintain it in fixed axial relationship therewith, means forming a variable volume fluid chamber having a movable wall, means forming a mechanical connection between the member and the wall, whereby movement of the wall is effective to cause movement of the member, and means to alter the volume of said chamber.

DON HEYER.
GEORGE T. PFLEGER.